United States Patent
Rook

(10) Patent No.: US 9,759,278 B2
(45) Date of Patent: Sep. 12, 2017

(54) MULTI-PIECE TORQUE TUBE ASSEMBLY TO MITIGATE VIBRATION

(71) Applicant: GOODRICH CORPORATION, Charlotte, NC (US)

(72) Inventor: Todd Rook, Tipp City, OH (US)

(73) Assignee: GOODRICH CORPORATION, Charlotte, NC (US)

(*) Notice: Subject to any disclaimer, the term of this patent is extended or adjusted under 35 U.S.C. 154(b) by 8 days.

(21) Appl. No.: 14/977,039

(22) Filed: Dec. 21, 2015

(65) Prior Publication Data
US 2017/0175832 A1    Jun. 22, 2017

(51) Int. Cl.
  *F16D 55/36*  (2006.01)
  *F16D 65/00*  (2006.01)
  *B64C 25/42*  (2006.01)

(52) U.S. Cl.
  CPC .......... *F16D 65/0006* (2013.01); *B64C 25/42* (2013.01); *F16D 55/36* (2013.01)

(58) Field of Classification Search
  CPC .............................. F16D 55/36; F16D 65/095
  USPC ................................................. 188/71.1, 71.5
  See application file for complete search history.

(56) References Cited

U.S. PATENT DOCUMENTS

| | | | |
|---|---|---|---|
| 4,807,351 A * | 2/1989 | Berg | B21D 26/14 29/419.2 |
| 5,647,683 A * | 7/1997 | Easley | B60B 27/001 403/267 |
| 5,908,091 A | 6/1999 | Berwanger | |
| 6,241,062 B1 | 6/2001 | Enright | |
| 6,296,084 B1 | 10/2001 | Trustee | |
| 6,631,793 B2 * | 10/2003 | Evrard | F16D 65/095 188/71.1 |
| 6,752,248 B2 * | 6/2004 | Berwanger | F16D 65/0006 188/71.5 |
| 7,192,357 B2 | 3/2007 | Kawakami | |
| 7,488,257 B1 * | 2/2009 | Booker | F16D 3/06 403/359.1 |
| 8,191,911 B1 | 6/2012 | Reynolds | |
| 8,616,344 B2 * | 12/2013 | Baden | F16D 55/36 188/71.5 |
| 8,616,345 B2 * | 12/2013 | Rook | F16D 55/36 188/71.4 |
| 2012/0325594 A1 * | 12/2012 | Rook | F16D 55/36 188/71.5 |
| 2013/0199878 A1 * | 8/2013 | Houser | F16D 55/36 188/73.39 |
| 2014/0356058 A1 * | 12/2014 | Lee | E02D 5/34 403/301 |

* cited by examiner

*Primary Examiner* — Christopher Schwartz
(74) *Attorney, Agent, or Firm* — Snell & Wilmer, L.L.P.

(57) ABSTRACT

A torque tube for use in a disk brake system in accordance with various embodiments includes a backleg having a reaction plate and a foot extending axially away from the reaction plate. The torque tube also includes a barrel having a tubular structure having an axis and an inner surface configured to receive the foot.

18 Claims, 5 Drawing Sheets

MULTI-PIECE TORQUE TUBE ASSEMBLY TO MITIGATE VIBRATION

FIELD

The present disclosure relates to aircraft braking systems. In particular, the disclosure relates to torque tube assemblies that include two or more parts for reducing vibration transfer.

BACKGROUND

Aircraft brake systems typically employ a series of friction disks forced into contact with each other to stop the aircraft. Friction disks splined to a non-rotating wheel axle are interspersed with friction disks splined to the rotating wheel. The friction disks are surrounded by a torque tube that is connected to a reaction plate. The friction disks are compressed towards the reaction plate during braking operations. Vibrations caused during this braking operation can transfer through the reaction plate and torque tube and result in unpleasant sensations.

SUMMARY

A torque tube for use in a disk brake system in accordance with various embodiments includes a backleg having a reaction plate and a foot extending axially away from the reaction plate. The torque tube also includes a barrel having a tubular structure having an axis and an inner surface configured to receive the foot.

In any of the foregoing torque tubes, the foot includes a plurality of spokes defining a plurality of slots, the barrel includes a plurality of tabs extending axially away from the tubular structure and each of the plurality of tabs are configured to be received by one of the plurality of slots such that each of the plurality of spokes is in contact with two of the plurality of tabs.

In any of the foregoing torque tubes, the foot further includes a lip extending axially away from the plurality of spokes and the lip is configured to be received by the tubular structure in response to the plurality of tabs being received by the plurality of slots.

In any of the foregoing torque tubes, the barrel further includes a bulkhead extending radially inward from the inner surface of the tubular structure that is configured to contact an axial face of the lip in response to the lip being received by the tubular structure.

In any of the foregoing torque tubes, the barrel further includes a plurality of splines extending axially along an outer surface of the tubular structure and the plurality of splines extend axially beyond a proximal end of the tubular structure to form the plurality of tabs.

In any of the foregoing torque tubes, the barrel is configured to be positioned radially inward from a plurality of friction disks and further includes a plurality of splines extending axially along an outer surface of the tubular structure that are configured to interface with at least one of the plurality of friction disks.

In any of the foregoing torque tubes, the barrel further includes a bulkhead extending radially inward from the inner surface of the tubular structure that contacts an axial face of the foot in response to the foot being received by the tubular structure.

In any of the foregoing torque tubes, the barrel is configured to be coupled to the foot by connectors extending axially through the bulkhead and the axial face of the foot.

In any of the foregoing torque tubes, the inner surface of the tubular structure defines a foot socket positioned axially between the bulkhead and an axial end of the tubular structure, the foot socket is configured to receive the foot, the foot socket has a socket distance in an axial direction, and the foot has a foot distance that is similar to the socket distance.

In any of the foregoing torque tubes, the barrel is configured to be coupled to the foot by connectors extending radially through the barrel and the foot.

In any of the foregoing torque tubes, the backleg further includes foot splines extending axially along the foot and the barrel further includes inner tube splines extending axially along the inner surface of the tubular structure that define spline sockets configured to receive the foot splines.

In any of the foregoing torque tubes, circumferential faces of the foot splines contact circumferential surfaces of the inner tube splines and radial faces of the foot splines contact the inner surface of the tubular structure in response to the foot splines being received by the spline sockets.

In any of the foregoing torque tubes, the foot splines and the inner tube splines are angled relative to the axial direction.

Also described is a torque tube in accordance with various embodiments for use in a disk brake system. The torque tube includes a backleg having a reaction plate and a foot extending axially away from the reaction plate, the foot including spokes that define slots therebetween. The torque tube also includes a barrel having a tubular structure having an axis and having a plurality of splines that extend along the tubular structure and extend beyond a proximal end of the tubular structure to form tabs that are each configured to be received by one of the slots.

In any of the foregoing torque tubes, the backleg further includes a lip extending axially away from the spokes and configured to be received by a lip socket defined by an inner surface of the tubular structure.

In any of the foregoing torque tubes, the barrel further includes a bulkhead extending radially inward from the tubular structure such that an axial face of the lip contacts the bulkhead in response to the lip being received by the lip socket.

Also described is a torque tube in accordance with various embodiments for use in a disk brake system. The torque tube includes a backleg having a reaction plate and a foot including axially-extending foot features defining foot slots therebetween. The torque tube also includes a barrel having a tubular structure and axially-extending barrel features configured to be received by the foot slots such that circumferential faces of the axially-extending foot features contact circumferential surfaces of the axially-extending barrel features in response to the axially-extending barrel features being received by the foot slots.

Any of the foregoing torque tubes can also include a pressure plate and the barrel further includes stator splines extending axially along an outer surface of the tubular structure and configured to support the pressure plate.

Any of the foregoing torque tubes can also include connectors configured to extend through a portion of the backleg and a portion of the barrel to resist movement of the backleg relative to the barrel.

In any of the foregoing torque tubes, at least a portion of the foot is configured to be received by a socket defined by an inner surface of the tubular structure such that an outer surface of the portion of the foot contacts the inner surface of the tubular structure in response to the portion of the foot being received by the socket.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
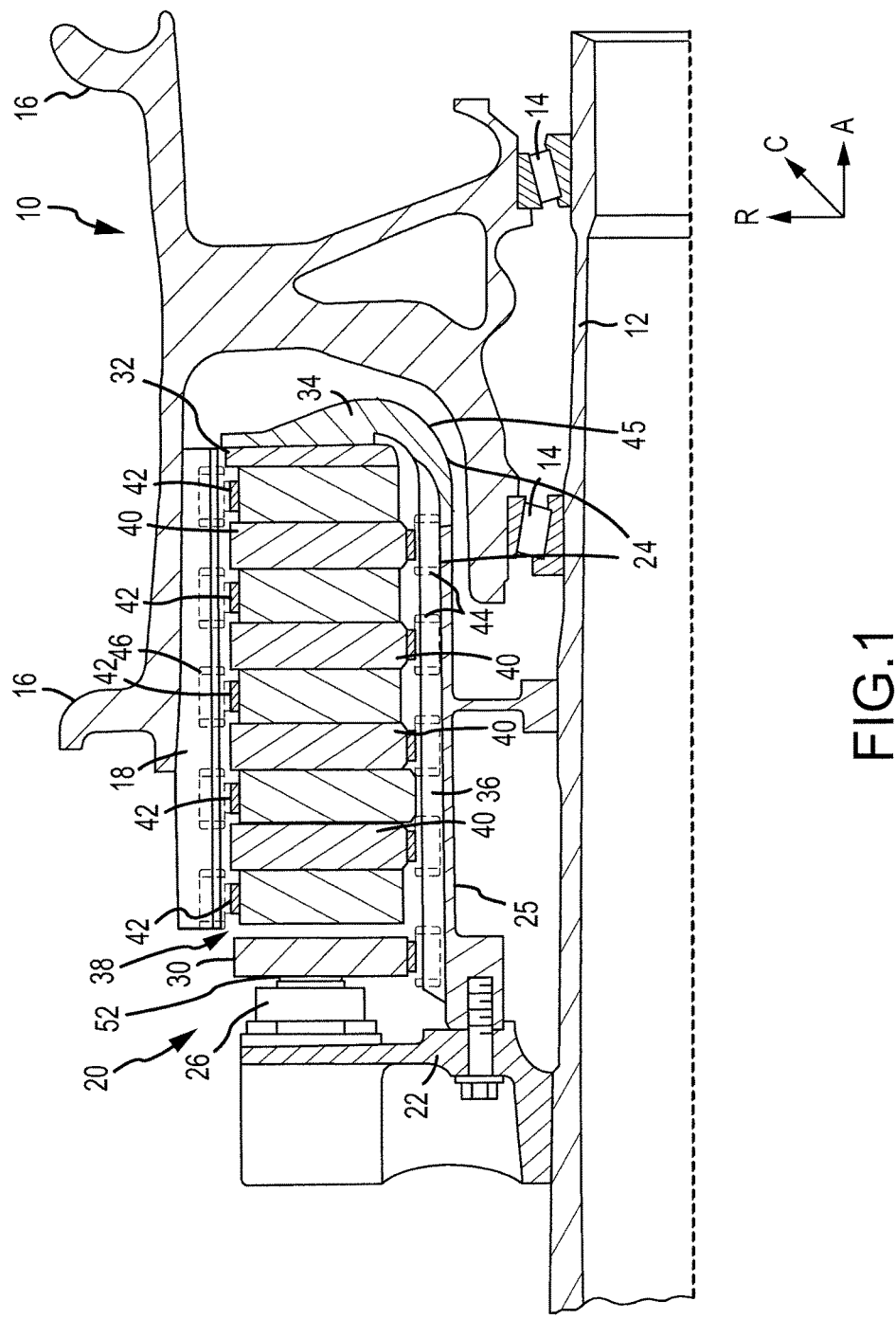
FIG. 1 illustrates a multi-disk brake system, in accordance with various embodiments.

With reference to FIG. 1, a multi-disk disk brake system 20, in accordance with various embodiments, may be used to reduce the speed of a wheel of an aircraft. An A-R-C axis has been included in the drawings to illustrate the axial (A), radial (R) and circumferential (C) directions. The system may include a wheel 10 supported for rotation around axle 12 by bearings 14. Wheel 10 includes rims 16 for supporting a tire, and a series of axially extending rotor splines 18 (one shown). Rotation of wheel 10 is modulated by multi-disk brake system 20. Disk brake system 20 includes torque flange 22, torque tube 24, a plurality of pistons 26 (one shown), pressure plate 30, and end plate 32. Torque tube 24 is an elongated annular structure that includes a barrel 25 that is positioned radially inward from one or more friction disks 38, a reaction plate 34 and a series of axially extending stator splines 36 (one shown) that each engage one or more of the friction disks. In some embodiments, a barrel may also or instead enclose friction disks 38.

Disk brake system 20 also includes a plurality of friction disks 38. The plurality of friction disks 38 includes at least one non-rotatable friction disk 40, also known as a stator, and at least one rotatable friction disk 42, also known as a rotor. Each of the friction disks 38 includes an attachment structure. In the embodiment of FIG. 1, each of four non-rotatable friction disks 40 include a plurality of stator lugs 44 at circumferentially spaced positions around non-rotatable friction disk 40 as an attachment structure. Similarly, each of five rotatable friction disks 42 include a plurality of rotor lugs 46 at circumferentially spaced positions around rotatable friction disk 42 as an attachment structure. In the embodiment shown in FIG. 1, pressure plate 30, end plate 32, and friction disks 38 are all annular structures made at least partially from a carbon composite material.

Torque flange 22 is mounted to axle 12. Torque tube 24 is bolted or otherwise coupled to torque flange 22 such that reaction plate 34 is near an axial center of wheel 10. End plate 32 is connected to, or is otherwise frictionally engaged with, a surface of reaction plate 34 facing axially away from the axial center of wheel 10. Thus, end plate 32 is non-rotatable by virtue of its connection or frictional engagement to torque tube 24. Stator splines 36 support pressure plate 30 so that pressure plate 30 is also non-rotatable. Stator splines 36 also support non-rotatable friction disks 40. Non-rotatable friction disks 40 engage stator splines 36 with gaps formed between stator lugs 44. Similarly, rotatable friction disks 42 engage rotor splines 18 with gaps formed between rotor lugs 46. Thus, rotatable friction disks 42 are rotatable by virtue of their engagement with rotor splines 18 of wheel 10.

As shown in FIG. 1, rotatable friction disks 42 are arranged with end plate 32 on a distal end, pressure plate 30 on a proximal end, and non-rotatable friction disks 40 interleaved so that rotatable friction disks 42 are adjacent to non-rotatable friction components. Pistons 26 are connected to torque flange 22 at circumferentially spaced positions around torque flange 22. Pistons 26 face axially toward wheel 10 and include pucks 52 that contact a side of pressure plate 30 opposite rotatable friction disks 42. Pistons 26 may be powered electrically, hydraulically or pneumatically.

In various embodiments, pucks 52 may be coupled to reaction plate 34 and corresponding mating surfaces may be positioned on end plate 32 such that in response to actuation of pistons 26, a force is exerted on the rotatable friction disks 42 and the non-rotatable friction disks 40 towards reaction plate 34. In response to end plate 32 being within a predetermined distance of reaction plate 34, the pucks coupled to reaction plate 34 contact the corresponding mating surfaces such that during a rub event, end plate 32 and reaction plate 34 make contact via the pucks and the corresponding mating surfaces. The rub event may cause undesirable vibrations that can transfer through the torque tube 24 and out the disk brake system 20.

To reduce this transfer of vibration, torque tube 24 can include a separate barrel 25 and backleg 45 (backleg 45 having the reaction plate 34). Either part may include some or all stator splines 36. A portion of the vibration generated during compression of the friction disks 38 can be absorbed between the barrel 25 and the backleg 45 as friction heat generated therebetween. This conversion of vibration energy into heat energy desirably reduces a total amount of vibration that exits the disk brake system 20.

Figure 2:
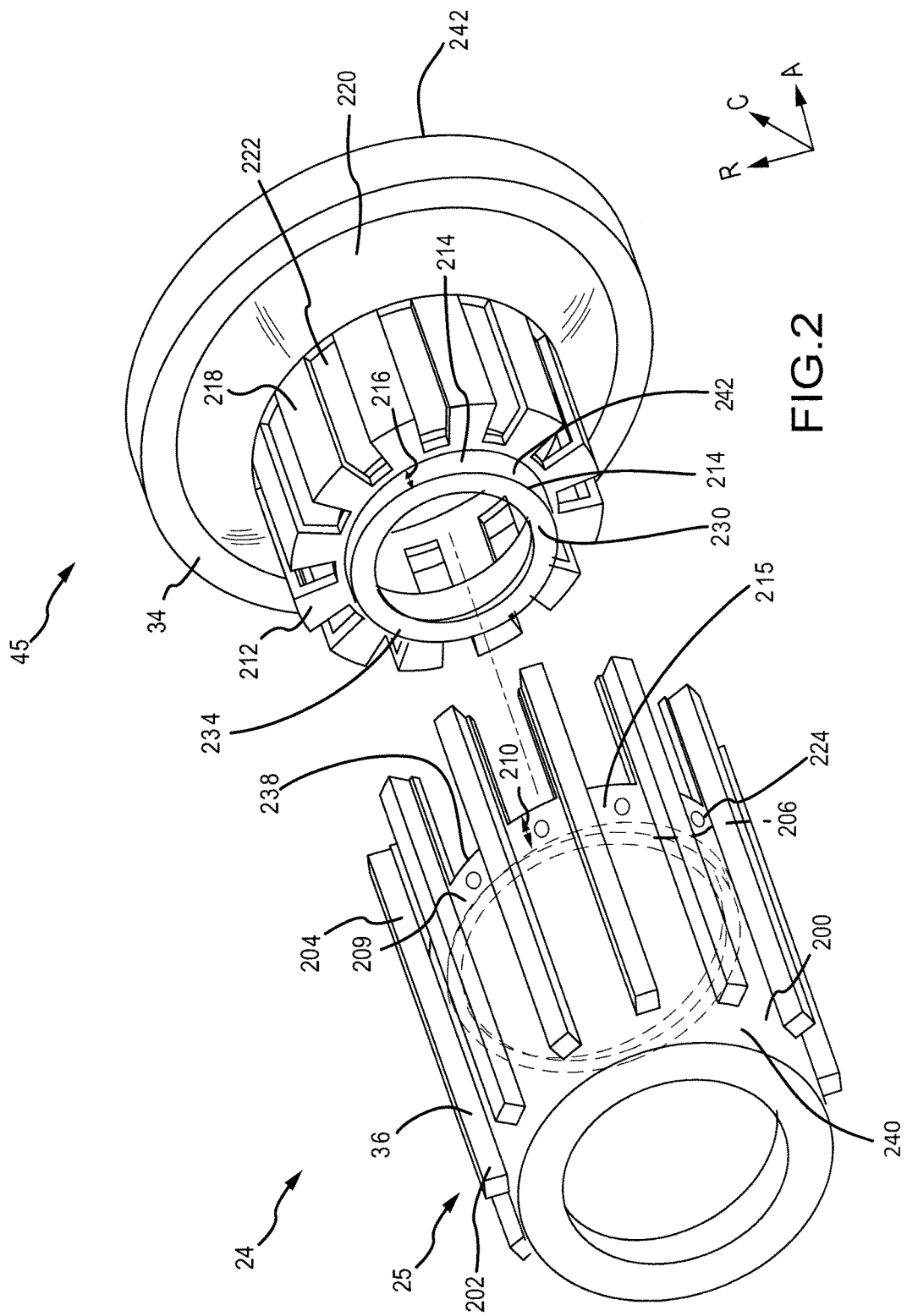
FIG. 2 illustrates a torque tube of the multi-disk brake of FIG. 1 having a backleg and a barrel, in accordance with various embodiments.

Referring to FIG. 2, barrel 25 is designed to be coupled to backleg 45. Backleg 45 may include a conic structure 220 at a distal end 242 and a foot 212 at a proximal end 234. Conic structure 220 may define or include reaction plate 34 and, thus, be adapted to interface with a friction disk, such as end plate 32 of FIG. 1.

Foot 212 may include a plurality of axially-extending foot features, or spokes 218, extending away from conic structure 220 and at least partially defining foot 212. A lip 214 may extend axially from proximal end 234 of backleg 45. Lip 214 may have a distance 216 in the axial direction.

Barrel 25 may include a tubular structure 200 with stator splines 36 extending axially along an outer surface 240 of tubular structure 200. Splines 35 may extend axially beyond a proximal end 238 of tubular structure 200. In that regard, the portion of splines 35 that extend beyond tubular structure 200 may be referred to as axially-extending barrel features, or tabs 204.

Tubular structure 200 may have an inner surface 209. A bulkhead 206 may extend radially inward from inner surface 209. Bulkhead 206 may be positioned a distance 210 from proximal end 238 of tubular structure 200. The area of inner surface 209 defined between bulkhead 206 and the axial end of tubular structure 200 may be referred to as a lip socket 215. Lip 214 of reaction plate 34 is designed to fit snugly (such as an interference fit or a press fit) within lip socket 215 such that friction may occur between lip 214 and lip socket 215 in response to vibration of barrel 25 and/or backleg 45. This friction can convert vibration energy into heat energy.

Tabs 204 may be designed to fit into slots 222 between spokes 218. In response to tabs 204 being positioned within slots 222, tabs 204 may contact spokes 218. The interfacing between tabs 204 and spokes 218 creates more surface area between barrel 25 and backleg 45 for converting vibration energy into heat.

Connectors 224 may be used to couple barrel 25 to reaction plate 34. In response to lip 214 being positioned within tubular structure 200, axial face 230 of lip 214 may contact bulkhead 206. This is because distance 216 may be similar to distance 210, such as within five percent (5%) distance 210. Contact between axial face 230 and bulkhead 206 indicates that backleg 45 is properly positioned within tubular structure 200. The interface between axial face 230 and bulkhead 206 is additional surface area for that may convert vibration energy (i.e., mechanical energy) into heat.

In response to lip 214 contacting bulkhead 206, connectors 224 may be extended radially through tubular structure 200 and an outer surface 232 of lip 214. Connectors 224 may be positioned at various intervals about torque tube 24. Connectors 224 may include studs, rivets, bolts, screws or the like and may resist movement of backleg 45 relative to barrel 25 in all directions. In various embodiments, additional or alternative connectors may extend through bulkhead 206 and axial face 230 of lip 214. In various embodiments, barrel 25 may not include bulkhead 206.

In various embodiments, bulkhead 206 may be positioned at proximal end 238 of tubular structure 200 such that distance 210 is approximately 0, such as between 0 inches (0", 0 millimeters (0 mm)) and between 0.25 inches (6.35 mm). In that regard, connectors may extend axially through bulkhead 206 and axial face 230 of lip 214 such that lip 214 is not received within the volume defined by tubular structure 200.

In various embodiments, additional or alternative connectors may be used to mate backleg 45 and barrel 25, such as between tabs 204 to spokes 218.

In various embodiments, tabs 204 may include a dovetail shape and spokes 218 may define slots 222 to resemble dovetail sockets. A dovetail interface results in additional contact surface between tabs 204 and spokes 218, thus increasing an amount of heat energy that can be created between backleg 45 and barrel 25. Spoke 218 and slots 222 are illustrated in a dovetail configuration.

Figure 3:
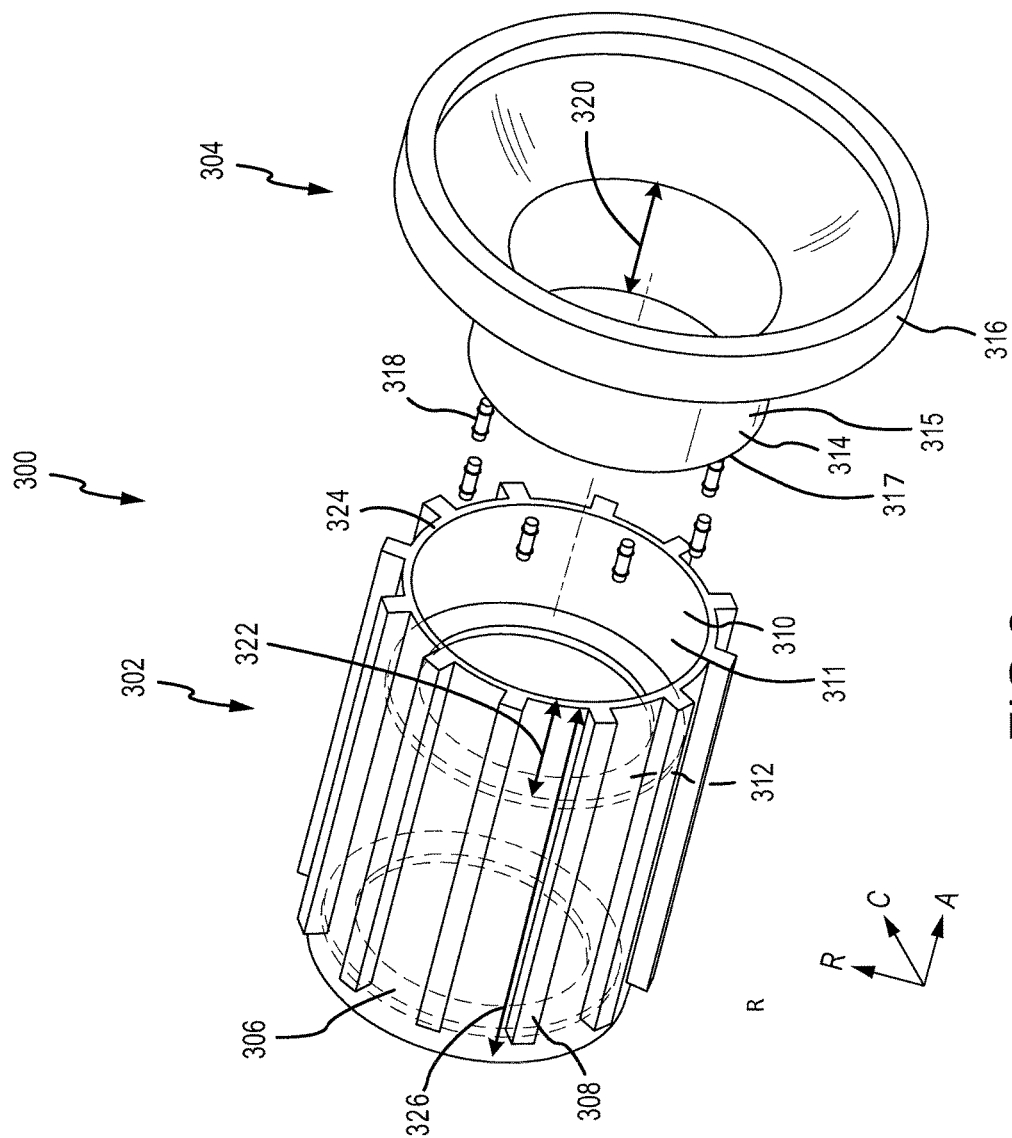
FIG. 3 illustrates another torque tube having a backleg and a barrel, in accordance with various embodiments.

Turning now to FIG. 3, another torque tube 300 having a barrel 302 and a backleg 304 is shown. Backleg 304 includes a conic structure 316 and a foot 314 extending axially away from conic structure 316. Foot 314 has an axial face 317 and an outer surface 315.

Barrel 302 includes a tubular structure 306 with splines 308 extending axially along an outer surface of tubular structure 306. Barrel 302 further includes a bulkhead 312 extending radially inward from an inner surface 310 of tubular structure 306. Inner surface 310 defines a foot socket 311 between bulkhead 312 and an axial end 324 of tubular structure 306. Foot socket 311 may have a socket distance 322 in the axial direction.

Backleg 304 is designed to mate with barrel 302. In particular, foot 314 is designed to be received by, and fit snugly in, foot socket 311. In response to foot 314 being positioned within foot socket 311, outer surface 315 of foot 314 may contact inner surface 310 of foot socket 311. Thus, in response to vibration of backleg 304 and/or barrel 302, a portion of vibration energy between backleg 304 and barrel 302 will be converted to heat via friction.

Foot 314 may have a foot distance 320 that is the same as, or similar to, the socket distance 322 of foot socket 311 (for example, foot distance 320 and socket distance 322 may be within 5% of each other). In response to foot 314 being positioned within foot socket 311, axial face 317 of foot 314 may contact bulkhead 312. This contact between axial face 317 and bulkhead 312 creates additional surface area for vibration energy to be converted to heat.

In various embodiments, an outer surface of a foot may have a non-circular shape that includes more surface area than circular outer surface 315 of tubular foot 314. Likewise, an inner surface of a tubular structure may have a non-circular shape that matches the non-circular shape of the outer surface of the foot. For example, the outer surface of the foot and the inner surface of the tubular structure can have a wave shape varying between radially inward and radially outward about their circumferences. This non-uniform shape may result in additional contact surface area between the foot and the tubular structure. This additional contact surface allows more vibration energy to be converted to heat.

Connectors 318 may be used to couple barrel 302 to backleg 304. For example and as shown in FIG. 3, connectors 318 may extend axially through bulkhead 312 and axial face 317 of foot 314. Connectors 318 may include any type of connector such as studs, rivets, screws, bolts or the like. Connectors 318 may resist movement of barrel 302 relative to backleg 304 in the circumferential and radial directions. In some embodiments, connectors 318 may include features that engage foot 314 and bulkhead 312 axially, thus also resisting axial movement.

In various embodiments, barrel 302 may not include bulkhead 312. In that regard, connectors may extend radially through tubular structure 306 and outer surface 315 of foot 314.

In various embodiments, foot distance 320 and/or socket distance 322 may be any distance. For example, foot distance 320 and/or socket distance 322 may be any percentage of tube distance 326 of tubular structure 306. For example, socket distance 322 may be between 5 percent (5%) and 100 percent (100%) of tube distance 326. The greater that socket distance 322 and foot distance 320 are relative to tube distance 326 of tubular structure, the more friction may occur between outer surface 315 of foot 314 and inner surface 310 of tubular structure 306. However, as foot distance 320 and socket distance 322 increase, additional material is may be needed to manufacture torque tube 300. This additional material adds undesirable weight and cost to torque tube 300. Thus, socket distance 322 and tube distance 326 may be selected based on the tradeoffs between a desired amount of vibration reduction and a desired cost/weight.

Figure 4:
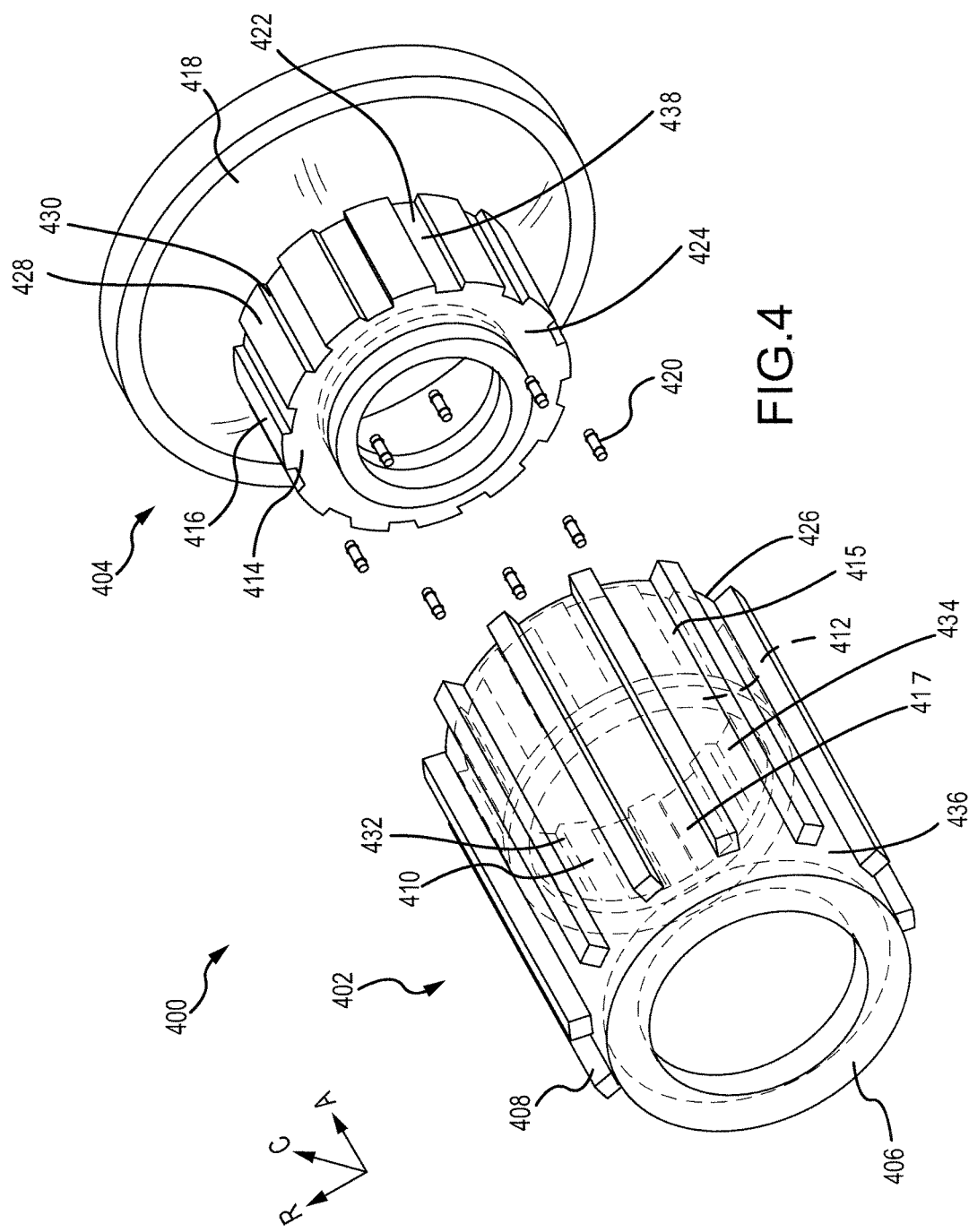
FIG. 4 illustrates another torque tube having a backleg and a barrel, in accordance with various embodiments.

Referring now to FIG. 4, another torque tube 400 includes a barrel 402 and a backleg 404. Backleg 404 may include a conic structure 418 and a foot 414. Foot 414 may include a plurality of foot splines 416 extending axially along an outer surface 422 of foot 414. Foot splines 416 define foot slots 438 therebetween. Foot 414 may also include an axial face 424.

Barrel 402 includes a tubular structure 406 and outer tube splines 408. Outer tube splines 408 may extend axially along an outer surface 436 of tubular structure 406.

Barrel 402 may also include a bulkhead 412. Tubular structure 406 may have an inner surface 434 that defines a foot socket 415 between bulkhead 412 and an axial end 426 of tubular structure 406. Barrel 402 may also include a plurality of axially-extending barrel features, or inner tube splines 410, extending axially along inner surface 434 between bulkhead 412 and axial end 426. In various embodiments, inner tube splines 410 may extend the entire distance between bulkhead 412 and axial end 426 or may only extend a portion of the distance between bulkhead 412 and axial end 426. Inner tube splines 410 define spline sockets 417 therebetween.

Foot socket 415 is designed to receive foot 414. Foot splines 416 can be received by spline sockets 417 such that foot 414 fits snugly within foot socket 415 and foot splines 416 fit snugly within spline sockets 417. Inner tube splines 410 can be received by foot slots 438. In response to foot splines 416 being received by spline sockets 417, radial faces 428 and circumferential faces 430 of foot splines 416 are designed to contact inner surface 434 of tubular structure 406 and circumferential surfaces 432 of inner tube splines 410, respectively. This contact between foot splines 416 and inner tube splines 410 creates additional contact surface between backleg 404 and barrel 402 than if foot splines 416 and inner tube splines 410 were not present. This additional contact surface allows more vibration energy to be converted to heat energy.

In various embodiments, in response to foot 414 being received by foot socket 415, an axial face 424 of foot 414 may contact bulkhead 412. Connectors 420 may extend axially through bulkhead 412 and axial face 424 and resist movement of backleg 404 relative to barrel 402 in all directions. In various embodiments, connectors may extend radially through tubular structure 406 and outer surface 422 of foot 414 and barrel 402 may or may not include bulkhead 412.

Figure 5:
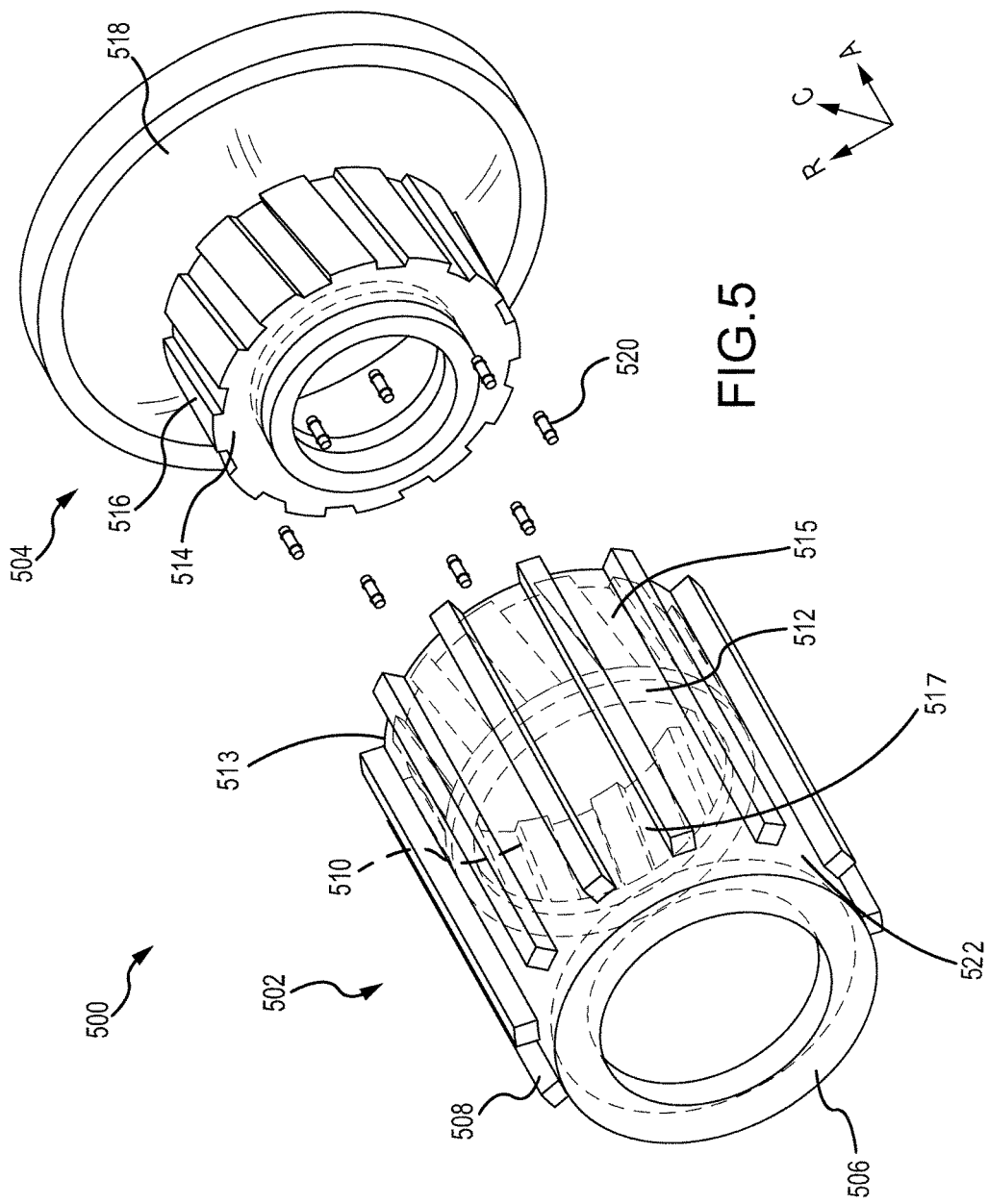
FIG. 5 illustrates another torque tube having a backleg and a barrel in accordance with various embodiments.

Referring now to FIGS. 4 and 5, a torque tube 500 may be similar to the torque tube 400. The torque tube 500 may include a backleg 504 and a barrel 502. The backleg 504 can include a conic structure 518 and a foot 514. The barrel 502 can include a tubular structure 506 with outer tube splines 508 extending axially along an outer surface 522 of tubular structure 506. Barrel 502 may also include a foot socket 515 extending between a bulkhead 512 and an axial end 513 of tubular structure 506.

Foot 514 may include foot splines 516 that are similar to foot splines 416 of backleg 404. However, foot splines 526 are angled in the circumferential direction relative to foot splines 416. Stated differently, foot splines 526 are angled relative to the axial direction.

Inner tube splines 510 of barrel 502 define splice sockets 517 that are angled to match foot splines 516. Because foot splines 516 and inner tube splines 510 are circumferentially angled, more contact surface may be present therebetween. Thus, more vibration energy can be converted to heat between backleg 504 and barrel 502 than between backleg 404 and barrel 402. In various embodiments, foot splines 516 and inner tube splines 510 may each have any shape for increasing an amount of contact surface therebetween.

Connectors 520 may be used to couple backleg 504 to barrel 502. Connectors 520 function similarly to connectors 420.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A torque tube for use in a disk brake system, comprising:
   a backleg having a reaction plate and a foot extending axially away from the reaction plate, the foot including a plurality of spokes defining a plurality of slots and a lip extending axially away from the plurality of spokes; and
   a barrel having a tubular structure having an axis, an inner surface configured to receive at least a portion of the foot, and a plurality of tabs extending axially away from the tubular structure, each of the plurality of tabs being configured to be received by one of the plurality of slots such that each of the plurality of spokes is in contact with two of the plurality of tabs, wherein the lip is configured to be received by the tubular structure in response to the plurality of tabs being received by the plurality of slots.

2. The torque tube of claim 1, wherein the barrel further includes a bulkhead extending radially inward from the inner surface of the tubular structure that contacts an axial face of the foot in response to the foot being received by the tubular structure.

3. The torque tube of claim 2, wherein the barrel is configured to be coupled to the foot by connectors extending axially through the bulkhead and the axial face of the foot.

4. The torque tube of claim 2, wherein:
   the inner surface of the tubular structure defines a foot socket positioned axially between the bulkhead and an axial end of the tubular structure,
   the foot socket is configured to receive the foot,
   the foot socket has a socket distance in an axial direction, and
   the foot has a foot distance that is similar to the socket distance.

5. The torque tube of claim 1, wherein the backleg further includes foot splines extending axially along the foot and the barrel further includes inner tube splines extending axially along the inner surface of the tubular structure that define spline sockets configured to receive the foot splines.

6. The torque tube of claim 5, wherein circumferential faces of the foot splines contact circumferential surfaces of the inner tube splines and radial faces of the foot splines contact the inner surface of the tubular structure in response to the foot splines being received by the spline sockets.

7. The torque tube of claim 5, wherein the foot splines and the inner tube splines are angled relative to the axial direction.

8. The torque tube of claim 1, wherein the barrel further includes a bulkhead extending radially inward from the inner surface of the tubular structure that is configured to contact an axial face of the lip in response to the lip being received by the tubular structure.

9. The torque tube of claim 1, wherein the barrel further includes a plurality of splines extending axially along an outer surface of the tubular structure and the plurality of splines extend axially beyond a proximal end of the tubular structure to form the plurality of tabs.

10. The torque tube of claim 1, wherein the barrel is configured to be positioned radially inward from a plurality of friction disks and further includes a plurality of splines extending axially along an outer surface of the tubular structure that are configured to interface with at least one of the plurality of friction disks.

11. The torque tube of claim 1, wherein the barrel is configured to be coupled to the foot by connectors extending radially through the barrel and the foot.

12. A torque tube for use in a disk brake system, comprising:
    a backleg having a reaction plate and a foot extending axially away from the reaction plate, the foot including spokes that define slots therebetween; and
    a barrel having a tubular structure having an axis and having a plurality of splines that extend along the tubular structure and extend beyond a proximal end of the tubular structure to form tabs that are each configured to be received by one of the slots.

13. The torque tube of claim 12, wherein the backleg further includes a lip extending axially away from the spokes and configured to be received by a lip socket defined by an inner surface of the tubular structure.

14. The torque tube of claim 13, wherein the barrel further includes a bulkhead extending radially inward from the tubular structure such that an axial face of the lip contacts the bulkhead in response to the lip being received by the lip socket.

15. A torque tube for use in a disk brake system, comprising:
    a backleg having a reaction plate and a foot including axially-extending foot features defining foot slots therebetween; and
    a barrel having a tubular structure and axially-extending barrel features extending beyond a proximal end of the tubular structure to form a plurality of tabs that are configured to be received by the foot slots such that circumferential faces of the axially-extending foot features contact circumferential surfaces of the axially-extending barrel features in response to the plurality of tabs being received by the foot slots.

16. The torque tube of claim 15, further comprising a pressure plate and wherein the barrel further includes stator splines extending axially along an outer surface of the tubular structure and configured to support the pressure plate.

17. The torque tube of claim 15, further comprising connectors configured to extend through a portion of the backleg and a portion of the barrel to resist movement of the backleg relative to the barrel.

18. The torque tube of claim 15, wherein at least a portion of the foot is configured to be received by a socket defined by an inner surface of the tubular structure such that an outer surface of the portion of the foot contacts the inner surface of the tubular structure in response to the portion of the foot being received by the socket.

* * * * *